Sept. 9, 1969         H. E. HRUSKA         3,465,842
POWER STEERING MECHANISM
Filed Dec. 29, 1967
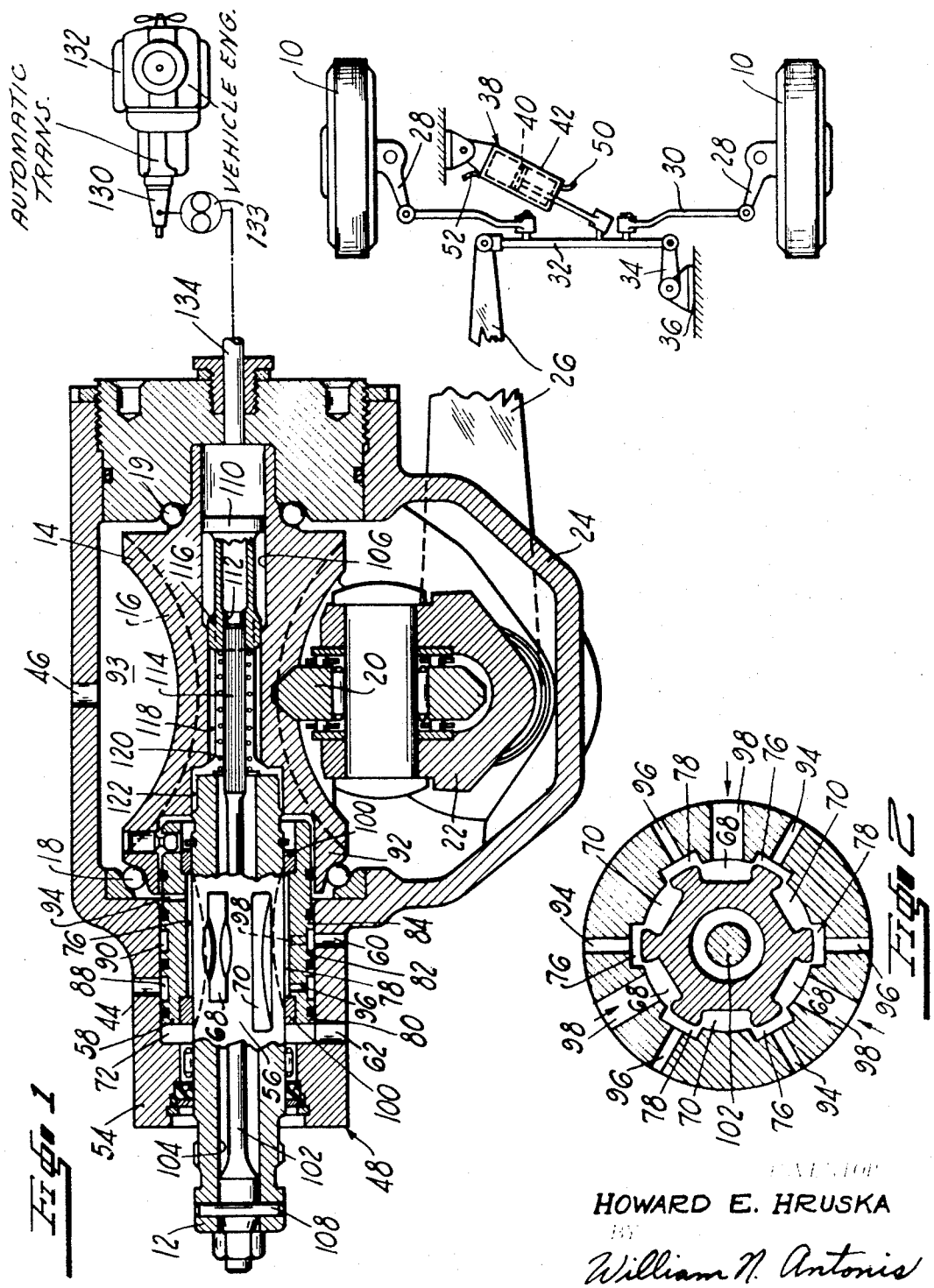
INVENTOR
HOWARD E. HRUSKA
William N. Antonis
ATTORNEY

United States Patent Office 3,465,842
Patented Sept. 9, 1969

3,465,842
POWER STEERING MECHANISM
Howard E. Hruska, South Bend, Ind., assignor to The Bendix Corporation, a corporation of Delaware
Filed Dec. 29, 1967, Ser. No. 694,546
Int. Cl. B62d 5/00; F15b 15/18, 9/10
U.S. Cl. 180—79.2
14 Claims

ABSTRACT OF THE DISCLOSURE

The following relates to a power steering system wherein the sensitivity or response thereof is reduced for high speed highway driving. More specifically, in a power steering system for an automotive vehicle having a manually operable steering member, a steerable wheel operatively coupled to the steering member, and reaction means, such as a torsion bar, operatively connected to the steering member for providing a resistance to movement of the steering member, a mechanism responsive to the speed of the vehicle is operatively connected to the torsion bar for increasing the amount of resistance to movement of the steering member exerted by the torsion bar, as the speed of the vehicle increases. The amount of resistance to movement exerted by the torsion bar is increased by decreasing the effective length of the torsion bar.

Background of the invention

Over the years various approaches have been utilized in order to obtain acceptable automotive vehicle steering characteristics. Initially, when vehicle speeds and loads on the front wheels were relatively low, it was possible to utilize low overall steering ratios, that is, a low ratio of steering wheel turns to dirigible wheel turns. As the weight of the vehicles increased the overall steering ratio was likewise increased in order to keep the manual steering efforts within reasonable limits. The steering ratios continued to be increased over the years until it became quite apparent that it was not feasible to increase them any further without detrimental effects on the vehicle steering characteristics. During this period power steering gained rapid acceptance as an alternative to still further increases in steering ratios.

Although the first power steering systems involved nothing more than a power assist attached to existing steering systems having undesirable high overall steering ratios, subsequent more advanced power steering systems utilized lower more desirable steering ratios. However, it was soon discovered that a steering ratio lowered to the best level for city driving and parking, combined with the low input force possible with power steering was too sensitive for highway driving speeds. Because of this problem most present-day vehicles which have a constant fixed steering ratio utilize a ratio which is a compromise between a low steering ratio for city driving and a high steering ratio for highway driving.

One proposed solution has been to provide a variable ratio steering system in which the overall steering ratio in the straight-ahead vehicle direction is high and progressively decreases as the vehicle front wheels are turned from their straight-ahead direction. With such an arrangement, it will be apparent that at highway speeds, wherein the front wheels seldom depart more than a few degrees from the straight-ahead direction, a high steering ratio is utilized, whereas during city driving involving cornering and parking, wherein the front wheels depart substantially from the straight-ahead position, a low steering ratio is utilized. It is contended by some power steering experts that although such a variable ratio steering system approaches the theoretical ideal, this ideal can only be attained if the steering ratio is varied infinitely from a desired low ratio to a desired high ratio as a function of vehicle speed.

While the prior art has offered variable steering systems in which the overall steering ratio is varied as a function of vehicle speed, these steering systems have achieved this result by imposing a new drive system, by changing the geometry of the conventional steering linkage, or by utilizing some other relatively complicated and expensive mechanism.

From the foregoing, it will be apparent that the premise is generally accepted that the sensitivity or response of a power steering system should be reduced for high speed highway driving and increased for low speed maneuvering. In other words, the work out, in terms of angle of excursion and force at the steered wheels, per unit of work put into the steering wheel should be less at high speeds than for low speed maneuvering. As previously discussed existing and proposed variable ratio systems achieve this goal of reducing highway sensitivity while retaining low speed maneuverability by utilizing a variable ratio gear with a high numerical ratio on center and a low numerical ratio off center. Inasmuch as only a very small excursion near center is utilized for high speed driving, a substantial portion of the maneuvering range is at the lower ratio.

Summary of the invention

Accordingly, in view of the foregoing, it is an object of this invention to provide a power steering system wherein the sensitivity and response thereof is reduced for high speed highway driving and increased for low speed maneuvering without varying the effective steering ratio of the system as a function of vehicle speed.

Further, it is an object of this invention to provide a power steering system having the foregoing desirable characteristics which is simple, relatively inexpensive, and easily maintained.

More particularly, it is an object of this invention to provide such a power steering system by varying as a function of speed the manual steering effort required to move the steering member instead of the effective steering ratio.

In other words, it is an object of this invention to provide a power steering system for an automotive vehicle comprising a manually operable steering member, a dirigible wheel operatively coupled to the steering member, reaction means operatively connected to the steering member for providing resistance to movement of the steering member, and mechanism responsive to the speed of the vehicle operatively connected to the reaction means for varying as a function of vehicle speed the amount of resistance to movement of the steering member exerted by the reaction means.

Specifically, it is an object of this invention to provide a power steering system of the type described wherein the reaction means includes a torsion bar for providing a resistance to movement of the steering member, and the speed responsive mechanism increases the amount of resistance to movement of the steering member by decreasing the effective length of the torsion bar as the speed of the vehicle increases.

The above and other objects and features of this invention will become apparent from the following description taken in connection with the accompanying drawings.

Brief description of the drawings

FIGURE 1 is a view partially in section of a power steering mechanism constructed in accordance with the present invention, which is shown in association with parts of the vehicle drawn schematically; and FIGURE 2 is a composite sectional view which shows the passages of the power steering valve moved into the same plane for purposes of more clearly illustrating the flow paths within the valve.

Description of the preferred embodiment

Referring to FIGURE 1, it will be seen that reference numeral 10 designates the front wheels of a vehicle to be steered by rotation of the steering shaft (not shown), which is suitably connected to the input shaft 12. Operatively connected to the input shaft 12 is an hourglass worm 14, having a groove type cam track 16 formed thereon, said worm being held against axial displacement by radial thrust bearings 18 and 19 located at each end of the worm. A roller sector gear 20 is arranged to engage the cam track 16 of the worm and is carried by one end of a sector shaft 22 which is suitably journalled in gear housing 24. A pitman arm 26 is connected to the other end of the sector shaft 22 and to the spindle arms 28 of the wheels 10 through a steering linkage assembly, which includes tie rods 30, a cross tie rod 32 and an idler arm 34 suitably pivoted at one end to the vehicle frame 36.

The hydraulic system of the power steering mechanism includes a fluid motor 38, which may be connected between the cross tie rod 32 and the vehicle frame 36, as shown in FIGURE 1. However, the fluid motor may be located at any other suitable position, e.g., integral with the steering gear housing. A piston 40 divides cylinder 42 into opposed chambers constantly communicating respectively with cylinder ports 44 and 46 of rotor valve 48, via conduits 50 and 52.

The main components of the rotary valve 48 are the valve housing 54, the rotor 56 which is formed on the input shaft 12, and the sleeve 58 which is located between the rotor and the valve housing. Located in the housing 54 are inlet port 60, outlet port 62, and the two previously mentioned cylinder ports 44 and 46. The rotor 56 contains six axially extending equally spaced slots formed on the outer periphery thereof, three of which are pressure slots and are designated by the reference numeral 68, and the other three of which are return slots and are designated by the reference numeral 70. It will be noted that the return slots 70 are longer than the pressure slots 68, so that the return slots may communicate with a return chamber 72 located at one end of sleeve 58.

Located on the inner periphery of valve sleeve 58 are six axially extending equally spaced slots, three of which are designated by the reference numeral 76, and the other three of which are designated by the reference numeral 78. Formed on the outer periphery of valve sleeve 58 are three annular lands 80, 82, and 84 and two annular grooves 88 and 90. Since sleeve 58 extends into the bore portion 92 of the worm bore, it is possible to eliminate the fourth annular land and third annular groove, both of which are normally common to rotary valves of this general type, as typified by Davis Patent No. 1,947,973. In view of the arrangement shown, it is possible to communicate steering gear cavity 93 with sleeve slot 76 via radially extending passages 94 without the necessity for utilizing an annular groove on the valve sleeve, since radially extending passages 94 open directly into the steering gear cavity. On the other hand, radially extending passages 96 communicate sleeve slot 78 with annular groove 88. Radially extending passages 98 communicate rotor slot 68 with annular groove 90. Thus, it can be seen from the drawing, particularly FIGURE 2, that when the rotary valve 48, which is an open center valve, is in a neutral straight-ahead position, flow will occur from inlet port 60 to outlet port 62 via annular groove 90, radially extending sleeve passages 98, axially extending rotor slot 68, axially extending sleeve slots 76 and 78, axially extending rotor slots 70, and return chamber 72. Cylinder port 44 communicates with sleeve slot 78 via radial sleeve passages 96 and annular groove 88, whereas cylinder port 46 communicates with sleeve slot 76 via radial passages 94 and steering gear cavity 93.

Seals are located in annular lands 80, 82, and 84 to prevent leakage thereacross. These seals are glass-filled Teflon endless sealing rings of rectangular section. Stop-off rings 100 seal off the axially extending sleeve slots 76 and 78 and also serve as bearings.

In order to simulate reaction and determine the manual effort required to steer the vehicle, a torsion bar 102, which is located within bores 104 and 106 of the input member 12 and the worm 14, respectively, is connected at one end to the input member by a pin 108 and is connected at the other end to an output member, namely the worm, by a connector 110 which is slidable within bore 106 of the worm. The connector is a sleeve-type piston having an internal splined portion 112 for engaging the splines 114 on the torsion bar, and an external splined portion 116 for engaging the spline 118 formed within the bore of the worm. Instead of splines, other suitable coupling means for permitting axial movement of the connector could be utilized, if desired. It will be apparent from the construction that the effective length of the torsion bar is determined by the position of the sleeve-type piston 110 within the worm bore. Thus, the longest effective torsion bar length is achieved when the piston 110 is in its extreme rightward position, as shown in FIGURE 1, and the shortest effective torsion bar length is achieved when the piston 110 has moved from the position shown to an extreme leftward position within the worm bore. A spring 120 is utilized to oppose movement of the piston in a direction tending to decrease the effective length of the torsion bar and to urge it in a direction which will provide the longest effective torsion bar length.

Referring to the schematic portion of FIGURE 1 it will be seen that an automatic transmission 130 is attached to the vehicle engine 132. The automatic transmission is coupled through a drive shaft, a differential, and a rear axle to a rear driving wheel, none of which are shown. The transmission 130 includes an output pump 133 which produces a pressure that is substantially a direct function of vehicle speed. Pressure from this output pump, which increases as the speed of the vehicle increases, is transmitted to the piston side of the slidable connector 110 through a conduit 134. As the transmission pressure increases, the slidable connector will move in a leftward direction and compress the spring 120 until the spring load balances the transmission pressure. In this manner, the effective length of the torsion bar is decreased as the speed of the vehicle increases, thereby increasing the torsional load necessary to actuate the rotary valve. In other words, shortening the effective length of the torsion bar increases the manual input or steering effort required to steer the vehicle. As a result increased vehicle speeds require increased steering efforts and, because of the increased steering efforts, vehicle steering stability at high speeds with low steering ratios is achieved. Although the automatic transmission is utilized in the description as a power source for moving the torsion bar connector 110, it will be understood that any suitable pressure source which varies as a function of vehicle speed, or a direct force from a governor could be used.

The three equally spaced flow paths previously described give balanced forces within the valve due to fluid flow, thereby eliminating any stickiness due to hydraulic unbalance. Upon rotation of the steering wheel, the valve rotor 56 is rotated relative to the valve sleeve 58 as a result of deflection of the torsion rod 102 which connects the valve rotor and the steering gear worm. This movement is in proportion to the input torque. As can more clearly be seen by reference to FIGURE 2, relative rotation between valve rotor 56 and valve sleeve 58 will cause one of the cylinder ports 44, 46 to communicate with the inlet port 60 and the other cylinder port to communicate with the outlet port 62. This will create a differential pressure across piston 40 and will result in power assisted steering.

A mechanical drive through spline type connection 122 with adequate clearance between teeth to provide valve actuation, is provided between the combination input rotor 12, 56 and the worm 14 which will result in a direct mechanical drive between the input shaft and the worm in the event of power failure. At all other times, this connection will permit limited relative rotary motion between the input shaft and the worm. The torsion rod 102, which connects the valve rotor and worm, provides mechanical "feel" without preventing the necessary angular movement required between the sleeve and rotor for valve operation.

The several practical advantages which flow from this novel inventive arrangement are believed to be obvious from the above description and other advantages may suggest themselves to those who are familiar with the art to which the invention relates.

Furthermore, although this invention has been described in connection with a certain specific embodiment, it will be obvious to those skilled in the art that various changes may be made in the form, structure, and arrangement of parts without departing from the spirit of the invention. For example, the movable connector could be located within the input member at the other end of the torsion bar. In addition, the invention could be utilized in conjunction with other conventional steering gear. Accordingly, I do not desire to be limited to the specific embodiment disclosed herein primarily for purposes of illustration, but instead desire protection falling within the scope of the appended claims.

Having thus described the various features of this invention, what I claim as new and desire to secure by Letters Patent is:

1. A power steering system for an automotive vehicle comprising a manually operable steering member, a dirigible wheel operatively coupled to said steering member, a torsion bar operatively connected to said steering member for providing a resistance to movement thereof, and means responsive to the speed of the vehicle operatively connected to said torsion bar for increasing the amount of resistance to movement of said steering member exerted by said torsion bar as the speed of the vehicle increases.

2. The structure, as defined in claim 1, wherein said speed responsive means varies the amount of resistance to movement of said steering member exerted by said torsion bar by varying the effective length of the torsion bar as a function of vehicle speed.

3. The structure, as defined in claim 2, wherein said speed responsive means decreases the effective length of said torsion bar as the speed of the vehicle increases.

4. The structure, as defined in claim 3, wherein said speed responsive means includes a source of fluid pressure varying in magnitude as a function of vehicle speed, piston means operatively connected to the torsion bar for varying the effective length of said torsion bar, and means for applying said pressure to said piston means.

5. The structure, as defined in claim 4, wherein said source of fluid pressure comprises the output pump of the vehicle automatic transmission.

6. A power steering mechanism for an automotive vehicle comprising a manually operable input member, an output member, a torsion rod for providing a resistance to movement of said input member, first means for connecting one end of said torsion rod to one of said members, second means for connecting the other end of said torsion rod to the other of said members, said second means including a movable connector element for varying the effective length of said torsion bar, and control means for causing said connector element to move as a function of vehicle speed.

7. The structure, as defined in claim 6, wherein said control means causes said connector element to move in a direction tending to decrease the effective length of said torsion bar as the speed of the vehicle increases.

8. The structure, as defined in claim 7, wherein said connector element includes a first portion for engaging said other end of said torsion rod and a second portion for engaging said other of said members to prevent relative movement between said interengaged members.

9. The structure, as defined in claim 8, wherein the other of said members includes a bore, and said connector element is located and axially slidable in said bore.

10. The structure, as defined in claim 9, wherein said connector element is a sleeve-type piston having an internal splined portion for engaging said other end of said torsion rod and an external splined portion for engaging said other of said members.

11. The structure, as defined in claim 10, wherein said control means includes a source of power for causing said piston to move axially in said bore and thereby decrease the effective length of said torsion bar.

12. The structure, as defined in claim 11, which includes spring means operatively connected to said piston for opposing movement of said piston in a direction tending to decrease the effective length of said torsion bar.

13. The structure, as defined in claim 12, wherein said source of power is a fluid pressure source which varies in magnitude as a function of vehicle speed.

14. The structure, as defined in claim 13, wherein said fluid pressure source comprises the outlet pump of the vehicle automatic transmission.

References Cited

UNITED STATES PATENTS

| 2,746,311 | 5/1956 | Lavender | 91—368 XR |
| 2,760,590 | 8/1956 | Stolte | 180—79.2 |
| 2,893,504 | 7/1959 | Jackson | 180—79.2 |
| 2,996,136 | 8/1961 | Nallinger et al. | 180—79.2 |
| 3,138,069 | 6/1964 | Bishop. | |
| 3,296,940 | 1/1967 | Eddy et al. | |

EDGAR W. GEOGHEGAN, Primary Examiner

U.S. Cl. X.R.

60—52; 91—375; 180—108